(12) United States Patent
Santhanam et al.

(10) Patent No.: US 10,825,279 B2
(45) Date of Patent: Nov. 3, 2020

(54) ITEM VALIDATION AND IMAGE EVALUATION SYSTEM WITH FEEDBACK LOOP

(71) Applicant: Bank of America Corporation, Charlotte, NC (US)

(72) Inventors: Murali Santhanam, Naperville, IL (US); Michael Joseph Pepe, Wilmington, DE (US); Jeanne M. Moulton, Concord, NC (US); Kerry Kurt Simpkins, Fort Mill, SC (US); Jasher David Fowles, Davidson, NC (US); John B. Hall, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 88 days.

(21) Appl. No.: 16/211,963

(22) Filed: Dec. 6, 2018

(65) Prior Publication Data

US 2020/0184759 A1    Jun. 11, 2020

(51) Int. Cl.
  *G07D 7/00* (2016.01)
  *G06K 9/00* (2006.01)
  *G06K 9/03* (2006.01)

(52) U.S. Cl.
  CPC ......... *G07D 7/003* (2017.05); *G06K 9/00469* (2013.01); *G06K 9/00483* (2013.01); *G06K 9/036* (2013.01)

(58) Field of Classification Search
  CPC .. G06Q 20/042; G06Q 20/10; G06Q 20/0425; G06Q 20/108; G06Q 40/00;
  (Continued)

(56) References Cited

U.S. PATENT DOCUMENTS 5,815,592 A    9/1998 Mennie et al.
5,901,253 A    5/1999 Tretter
(Continued)

OTHER PUBLICATIONS

U.S. Appl. No. 16/157,276, Item Validation and Image Evaluation System, filed Oct. 11, 2018.
(Continued)

*Primary Examiner* — Golam Sorowar
(74) *Attorney, Agent, or Firm* — Banner & Witcoff, Ltd.; Michael A. Springs

(57) ABSTRACT

Systems for item validation and image evaluation are provided. In some examples, a system may receive an instrument and associated data. The instrument may be received and at least one of a bill pay profile and a user profile may be retrieved. The bill pay profile and user profile may each include a plurality of previously processed instruments that have been determined to be valid and/or authentic. The instrument may be compared to the plurality of previously processed instruments to determine whether one or more elements of the instrument being evaluated match one or more corresponding elements of the plurality of previously processed instruments. Matching or non-matching elements may be identified. In some examples, one or more user interfaces may be generated displaying the instruments and including any highlighting or enhancements identifying matching or non-matching elements.

17 Claims, 13 Drawing Sheets

(58) Field of Classification Search
CPC .... G06Q 40/02; G06Q 20/102; G06Q 20/105; G06Q 20/1085; G06Q 20/3223; G06Q 20/40; G06Q 20/403; G06Q 20/405; G06Q 30/0609; G06Q 40/12; G06Q 20/04; G06Q 20/32; G06Q 20/3221; G06Q 20/3224; G06Q 20/3229; G06K 2009/6213; G06K 9/00442; G06K 9/00469; G06K 9/3258; G06K 9/36; G06K 9/4609; G06K 9/4642; G06K 9/6201; G06K 9/78

See application file for complete search history.

(56) References Cited

U.S. PATENT DOCUMENTS

| | | | |
|---|---|---|---|
| 6,026,189 | A | 2/2000 | Greenspan |
| 6,430,320 | B1 | 8/2002 | Jia et al. |
| 7,920,714 | B2 | 4/2011 | O'Neil |
| 8,155,425 | B1 | 4/2012 | Mandel |
| 8,417,017 | B1 | 4/2013 | Beutel et al. |
| 8,824,772 | B2 | 9/2014 | Viera et al. |
| 9,129,340 | B1* | 9/2015 | Medina, III ....... H04N 1/40012 |
| 9,218,701 | B2 | 12/2015 | Cantley et al. |
| 9,652,690 | B2 | 5/2017 | Eid et al. |
| 9,843,731 | B2 | 12/2017 | Shimosato |
| 2002/0146170 | A1 | 10/2002 | Rom |
| 2004/0247168 | A1 | 12/2004 | Pintsov et al. |
| 2005/0243378 | A1 | 11/2005 | Klein et al. |
| 2006/0202012 | A1 | 9/2006 | Grano et al. |
| 2006/0255124 | A1 | 11/2006 | Hoch et al. |
| 2007/0136198 | A1 | 6/2007 | Foth et al. |
| 2008/0025555 | A1 | 1/2008 | Visan et al. |
| 2012/0170829 | A1 | 7/2012 | Jackson et al. |
| 2012/0177281 | A1* | 7/2012 | Frew ................... G06Q 20/042 382/137 |
| 2014/0112571 | A1 | 4/2014 | Viera et al. |
| 2014/0184848 | A1 | 7/2014 | Shimosato |
| 2014/0355865 | A1 | 12/2014 | Cantley et al. |
| 2015/0139492 | A1 | 5/2015 | Murakami et al. |
| 2015/0161765 | A1 | 6/2015 | Kota et al. |
| 2015/0186753 | A1 | 7/2015 | Horita |
| 2016/0085564 | A1 | 3/2016 | Arcese et al. |
| 2016/0253573 | A1 | 9/2016 | Eid et al. |
| 2017/0011404 | A1 | 1/2017 | Clower et al. |
| 2017/0052944 | A1 | 2/2017 | Choudhry et al. |
| 2018/0096340 | A1 | 4/2018 | Omojola et al. |

OTHER PUBLICATIONS

U.S. Appl. No. 16/157,329, Image Evaluation and Dynamic Cropping System, filed Oct. 11, 2018.

U.S. Appl. No. 16/157,384, Enterprise Profile Management and Control System, filed Oct. 11, 2018.

U.S. Appl. No. 16/157,473, Dynamic Profile Control System, filed Oct. 11, 2018.

Enhanced Item Validation and Image Evaluation System, filed Dec. 6, 2018.

* cited by examiner

ITEM VALIDATION AND IMAGE EVALUATION SYSTEM WITH FEEDBACK LOOP

CROSS REFERENCE TO RELATED APPLICATIONS

This application is related to concurrently filed U.S. application Ser. No. 16/212,043, and entitled, "ENHANCED ITEM VALIDATION AND IMAGE EVALUATION SYSTEM," which is incorporated herein by reference in its entirety.

BACKGROUND

Aspects of the disclosure relate to electrical computers, systems, and machine learning. In particular, one or more aspects of the disclosure relate to item validation and image evaluation.

Thwarting unauthorized activity on one or more accounts is an important function. As unauthorized actors become more sophisticated, it can be difficult to identify unauthorized instruments. Further, even systems configured to identify unauthorized instruments can identify false positives. Accordingly, it would be advantageous to have a system for further evaluating instruments, for instance, after an initial evaluation, to determine whether the instrument is unauthorized, identify aspects of an authorized or unauthorized instrument, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some examples, a system, computing platform, or the like, may receive an instrument and associated data. In some examples, the instrument may have been previously evaluated or processed to determine validity and/or authenticity. In some arrangements, the associated data may include a validity rating.

The instrument may be received and a user profile may be retrieved. The user profile may include a plurality of previously processed instruments that have been determined to be valid and/or authentic. The instrument may be compared to the plurality of previously processed instruments to determine whether one or more elements of the instrument being evaluated match one or more corresponding elements of the plurality of previously processed instruments. Matching or non-matching elements may be identified. In some examples, one or more user interfaces may be generated displaying the instruments and including any highlighting or enhancements identifying matching or non-matching elements.

Users may source authentic instruments from different sources and/or production runs. Differences between such instruments may result in a false positive. In some cases, an identifier may be used to identify whether an instrument is associated with a known instrument source even when instruments from that particular source have not already been processed and included in the user profile. In some cases, authentication processes may be improved through use of a feedback loop to hold and evaluate the instruments before associated data is included in the user's profile.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates an example of a user interface in accordance with one or more aspects described herein;

FIG. 5 illustrates an example of a user interface in accordance with one or more aspects described herein;

DETAILED DESCRIPTION

Figure 1A:
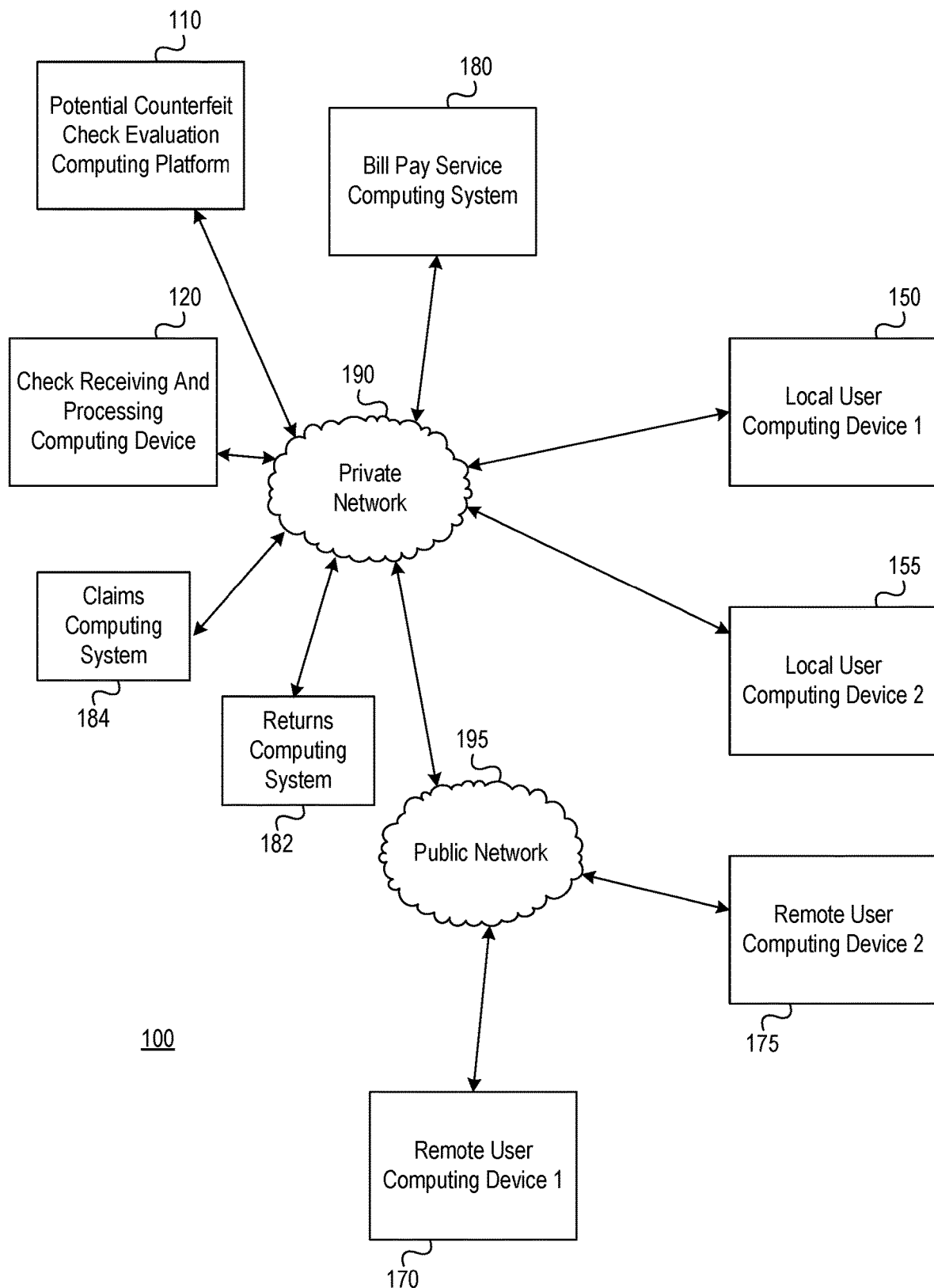
FIGS. 1A and 1B depict an illustrative computing environment for implementing item validation and image evaluation functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to item validation and image evaluation.

As mentioned above, protecting user data and thwarting unauthorized activity is a priority for most users. In some examples, unauthorized actors may generate unauthorized or invalid checks or other instruments. The checks or other instruments may be generated to appear similar to valid checks or other instruments of the user, but, in some examples, might not be identical. For instance, one or more of static (e.g., payee line, payer information, magnetic ink character recognition (MICR) line, date, and the like) elements, and/or one or more dynamic elements (e.g., signature, date information, amount information, payee information, or the like) may be slightly or substantially different from a valid instrument. Accordingly, systems may identify similarities or differences to determine whether the instrument is likely valid or authentic. However, these systems do not offer substantial information as to why an instrument was deemed valid or invalid and also may be inaccurate and identify false positives.

Accordingly, aspects described herein are directed to systems for further analyzing checks or other instruments to identify why the check or other instrument was deemed valid or invalid and to eliminate the likelihood of false positives. In some examples, a system, computing platform, or the like, may receive a check or other instrument. In some arrangements, additional data may also be received, such as a validity score associated with the check or other instrument.

In some arrangements, a user profile may be retrieved, such as from a database. The user profile may include information associated with the user (e.g., name, contact information, account information, and the like), as well as a plurality of checks or other instruments associated with the user that were previously processed. The check or instrument being evaluated may be compared to the plurality of checks or other instruments in the user profile to evaluate validity identify matching or non-matching elements, and the like. One or more user interfaces may be generated displaying the check or instrument being evaluated and one or more checks or other instruments from the user profile and similarities or differences may be identified on the user interface.

In some cases, the user may utilize an electronic service (e.g., a bill pay service, and the like) that allows a user online access to their account and/or to a service authorized to generate authentic checks or other instruments to be sent to a third party. In some cases, these checks or instruments may trigger a false positive, such as when similar checks or instruments have not been included in the user profile. Because the bill pay issued checks or instruments have been generated from a known source, a unique bill pay identifier may be checked and used, when identified, to compare the check or instrument to a bill pay profile. A validated bill pay check or instrument may then be added to a user's profile.

In some cases, a check or instrument may be incorrectly identified as being valid and improperly included in a user's profile. To avoid such situations, a received check or instrument may be placed on a hold status for a defined period of time (e.g., a waiting period of 21 days, 30 days, and the like). During the waiting period, the check may be periodically (e.g., daily) checked against a first data source associated with fraudulent items reported by users and/or to a second data source associated with potential fraudulent items returned from a third party. Matching items may be flagged and/or prevented from being included in the user's profile. In some cases, a fraudulent or otherwise invalid check or instrument may be inadvertently included in a user's profile. To address such situations, information associated with checks and/or instruments in the user's profile may be compared with items stored in the first data source associated with fraudulent items reported by users and/or with items stored in the second data source associated with potential fraudulent items returned from a third party. In some cases, this comparison is done once. In some cases, the comparison may be performed periodically, such as daily, weekly, monthly, or the like. If a match is found, the particular check or instrument may be flagged and/or removed from the user's profile to prevent matching items from inadvertently being accepted in the future.

Accordingly, outputs from the evaluation described herein may be used to further update, validate and/or refine systems used to perform initial evaluations of checks or other instruments to determine validity.

These and various other arrangements will be discussed more fully below.

Figure 1B:
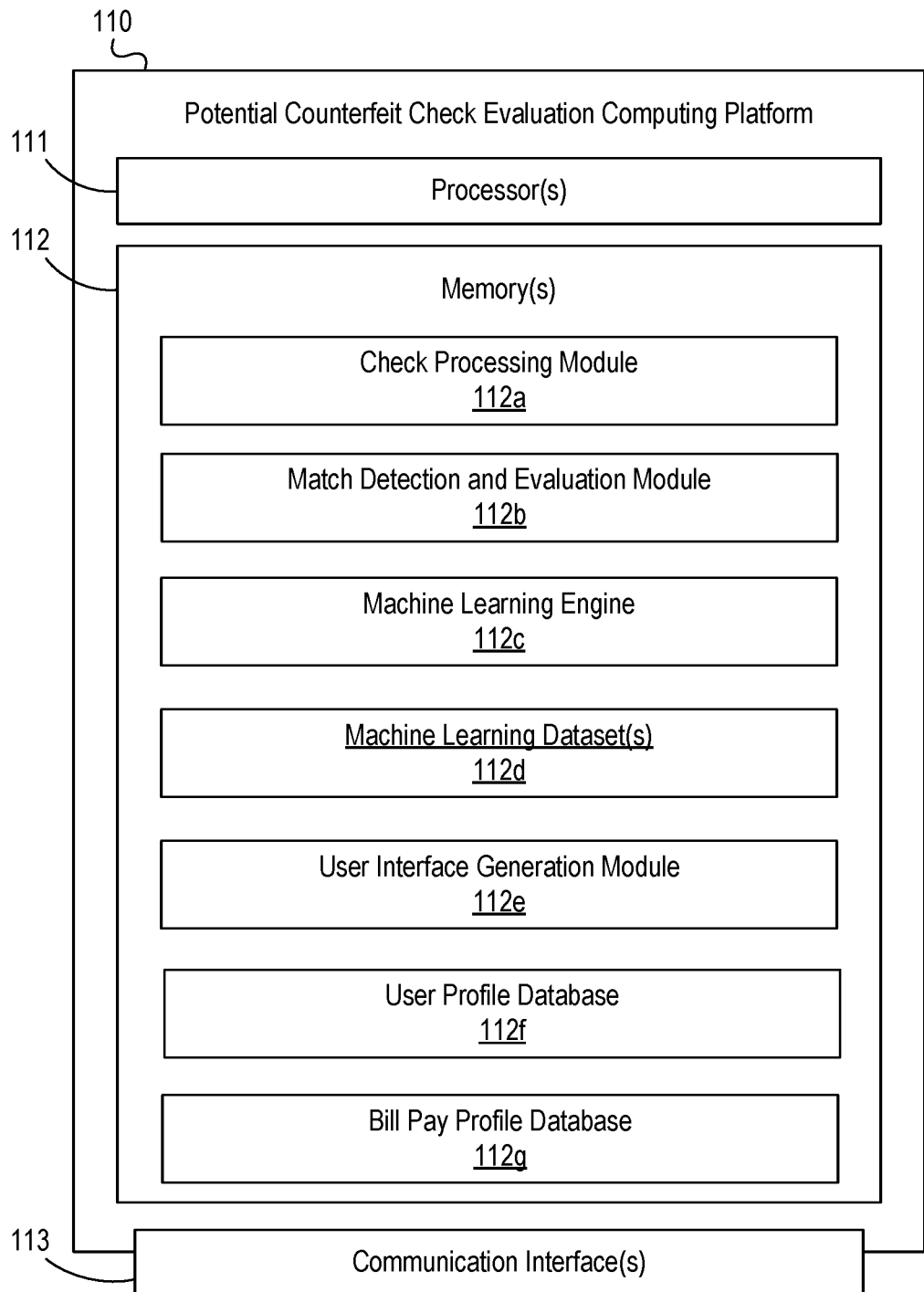

FIGS. 1A and 1B depict an illustrative computing environment for implementing and using a system for item validation and image evaluation in accordance with one or more aspects described herein. Referring to FIG. 1A, the computing environment 100 may include one or more computing devices and/or other computing systems. For example, the computing environment 100 may include a potential counterfeit check evaluation computing platform 110, a check receiving and processing computing device 120, external data computing device 130, a first local user computing device 150, a second local user computing device 155, a first remote user computing device 170, a second remote user computing device 175, a bill pay system 180, a claims computing system 182, and a returns computing system 184.

The potential counterfeit check evaluation computing platform 110 may be configured to host and/or execute a machine learning engine to provide intelligent, dynamic image evaluation and item validation with respect to checks or other instruments or documents that have been identified as potentially fraudulent or otherwise unauthorized. For instance, the check receiving and processing computing device 120 may include one or more computing devices, servers, or the like, configured to receive checks or other instruments from a variety of sources. For instance, checks may be received via online or mobile banking applications executing on a user computing device, such as the remote user computing device 170, 175, from an automated teller machine (ATM) or other self-service kiosk, from a banking application or device associated within a financial institution location, or the like. In some cases, checks may be issued against a user's account in response to a bill pay request. The bill pay request may be generated in response to user direct user interaction or through predefined criteria to automate bill pay functions through use of a bill pay service operating on the bill pay computing system 180 of a financial institution computing system. The user may interact with the bill pay computing system 180 via a computing device via a web interface and/or through an application interface operating on a user's mobile device.

In some examples, the checks may be received by the check receiving and processing computing device 120 and may be processed, in real-time or near real-time, to evaluate the validity of the check or other instrument. In some examples, processing the check or other instrument may include comparing the check to one or more checks in a user profile and/or a bill pay profile associated with users drafting the checks (e.g., account holder, payer, or the like) and generating a score representing a likelihood that the check is fraudulent. For instance, the check receiving and processing computing device 120 may compare the received check to the plurality of checks in the user profile to evaluate various regions, fields or aspects of the check to determine whether the received check matches one or more checks in the user profile. Based on a number of matching items, a score may be determined. For instance, if several regions, fields, or the like, match, a low score may be generated indicating that there is a low likelihood that the check is fraudulent. If few or no items match, a high score may be generated indicating that it is very likely that the check is fraudulent.

In some examples, the check receiving and processing computing device 120 may convert the check to a digital image or may store a digital image of the check (e.g., if received via electronic systems such as online or mobile banking applications). This check image data, as well as the generated score, may be transmitted to the potential counterfeit check evaluation computing platform 110.

In some examples, all checks processed by the check receiving and processing computing device 120 may be transmitted to the potential counterfeit check evaluation computing platform 110. In other examples, only certain checks may be transmitted, such as those meeting certain criteria (e.g., having a generated score within a predetermined range, having particular data fields that match or do not match, history of fraudulent or unauthorized activity associated with an account of the check, or the like).

The potential counterfeit check evaluation computing platform 110 may receive the check and may perform an additional comparison of the check to the plurality of checks in a user profile. In some examples, this additional evaluation of the check or check image data may be performed to provide additional information related to why a particular score was generated for the check. In systems implemented by large entities, such as a financial institution, millions of checks are being processed and evaluated every day. Accordingly, providing a secondary system to generate additional information related to why a particular score was generated for a check would increase efficiency, accuracy of checks flagged as fraudulent, aid in updating and validating systems for generating scores, and the like.

In some examples, the potential counterfeit check evaluation computing platform 110 may display the check being evaluated along with one or more other checks in the user profile. A secondary comparison may be performed and regions or fields that match or do not match may be highlighted or otherwise visually indicated (e.g., by generating a border around a region or field, by inserting a callout or other icon near a region or field, a bill pay identifier, or the like). For instance, if the check being evaluated matches one or more other checks (or portions or regions of the checks match) the check being evaluated and the matching check may be displayed with matching points highlighted. Alternatively, if the check being evaluated does not match one or more checks within the user profile, the check being evaluated may be displayed with the check from the profile that does not match and non-matching regions or fields may be highlighted. In some examples, the check being evaluated and the matching/non-matching check from the user profile and/or the bill pay profile may be displayed simultaneously. In some cases, an identifier retrieved from a data store of the claims computing system 182 and/or from a data store of the returns computing system 184 may be highlighted on an image of the check being evaluated.

In some arrangements, the potential counterfeit check evaluation computing device 110 may evaluate a plurality of fields or regions. For instance, static elements of the checks, such as the payee line, location of the magnetic ink character recognition (MICR) line, signature line, position of check number, location of name of account holder, or the like, may be evaluated. In some examples, a pixel associated with a particular point of each static element may be compared. For instance, a pixel associated with a position of a start of the MICR line on the check being evaluated may be compared to a pixel associated with a position of a start of the MICR line on checks in the user profile. If the pixels or pixel locations (e.g., based on x and y coordinates) match, that may be one factor indicating that the check is likely not fraudulent. Pixel locations for various other elements may be compared similarly.

In some cases, one or more of the plurality of fields or regions including, but not limited to, the payee line, location of the magnetic ink character recognition (MICR) line, signature line, position of check number, location of name of account holder, or the like, may be used as a bill pay identifier. In some cases, a location, shape, size of a bill pay identifier may differ between different printing runs of bill pay checks due to one or more manufacturing or printing variations. A financial institution may scan or otherwise generate a bill pay profile entry associated with one or more checks from a printing run, a manufacturer or the like. Such bill pay profile entries may be used as a validated representation of an authentic bill pay check or instrument. In some cases, the checks used in generating the bill pay profile may be randomly and/or sequentially sampled from checks received from one or more manufacturers.

In addition to static elements being compared, dynamic check elements may also be compared. For instance, a signature or position of a signature, a start of data including a date of the check, a start of data including an amount of the check, or the like may be evaluated. In some examples, machine learning may be used to evaluate these and other elements of the check.

Accordingly, upon identifying matching or non-matching elements, data may be provided to a user indicating the matching/non-matching elements, and/or providing options for additional actions. For instance, if the check is a match, the system may provide an option to add the check to a user profile.

The local user computing device 150, 155 and the remote user computing device 170, 175 may be configured to communicate with and/or connect to one or more computing devices or systems shown in FIG. 1A. For instance, the local user computing device 150, 155 may communicate with one or more computing systems or devices via the network 190, while the remote user computing device 170, 175 may communicate with one or more computing systems or devices via the network 195. In some examples, the local user computing device 150, 155 may be used to access one or more entity systems, functions or processes. In some examples, the local user computing device 150, 155 may be used to access the potential counterfeit check evaluation computing platform 110 and/or the check receiving and processing computing device 120 to control parameters of the system, update rules, modify settings, and the like. The local user computing device 150, 155 may also include ATMs or other self-service kiosks, as well as banking associated computing devices, that may receive checks from a user and may transmit the check or check images for further processing.

The remote user computing devices 170, 175 may be used to communicate with, for example, the potential counterfeit check evaluation computing platform 110 and/or the check receiving and processing computing device 120 to capture check image data, transmit check image data, and the like.

For instance, the remote user computing devices 170, 175 may include user computing devices, such as stationary computing devices (e.g., a desktop computer) and/or mobile devices including smartphones, tablets, laptop computers, and the like, that may be used to access and/or execute online banking applications, mobile banking applications, or the like.

In one or more arrangements, the check receiving and processing computing device 120, the local user computing device 150, the local user computing device 155, the remote user computing device 170, and/or the remote user computing device 175 may be any type of computing device or combination of devices capable of performing the particular functions described herein. For example, the check receiving and processing computing device 120, the local user computing device 150, the local user computing device 155, the remote user computing device 170, and/or the remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the check receiving and processing computing device 120, the local user computing device 150, the local user computing device 155, the remote user computing device 170, and/or the remote user computing device 175 may, in some instances, be special-purpose computing devices configured to perform specific functions.

The computing environment 100 also may include one or more computing platforms. For example, and as noted above, the computing environment 100 may include the potential counterfeit check evaluation computing platform 110. As illustrated in greater detail below, the potential counterfeit check evaluation computing platform 110 may include one or more computing devices configured to perform one or more of the functions described herein. For example, the potential counterfeit check evaluation computing platform 110 may include one or more computers (e.g., laptop computers, desktop computers, servers, server blades, or the like).

As mentioned above, the computing environment 100 also may include one or more networks, which may interconnect one or more of the potential counterfeit check evaluation computing platform 110, the check receiving and the processing computing device 120, the local user computing device 150, the local user computing device 155, the remote user computing device 170, and/or the remote user computing device 175. For example, the computing environment 100 may include the private network 190 and the public network 195. The private network 190 and/or the public network 195 may include one or more sub-networks (e.g., Local Area Networks (LANs), Wide Area Networks (WANs), or the like). The private network 190 may be associated with a particular organization (e.g., a corporation, financial institution, educational institution, governmental institution, or the like) and may interconnect one or more computing devices associated with the organization. For example, the potential counterfeit check evaluation computing platform 110, the check receiving and processing computing device 120, the local user computing device 150, and the local user computing device 155, may be associated with an organization (e.g., a financial institution), and the private network 190 may be associated with and/or operated by the organization, and may include one or more networks (e.g., LANs, WANs, virtual private networks (VPNs), or the like) that interconnect the potential counterfeit check evaluation computing platform 110, the check receiving and processing computing device 120, the local user computing device 150, and the local user computing device 155, and one or more other computing devices and/or computer systems that are used by, operated by, and/or otherwise associated with the organization. The public network 195 may connect the private network 190 and/or one or more computing devices connected thereto (e.g., the potential counterfeit check evaluation computing platform 110, the check receiving and processing computing device 120, the local user computing device 150, the local user computing device 155) with one or more networks and/or computing devices that are not associated with the organization. For example, the remote user computing device 170, and/or the remote user computing device 175 might not be associated with an organization that operates the private network 190 (e.g., because the remote user computing device 170 and the remote user computing device 175 may be owned, operated, and/or serviced by one or more entities different from the organization that operates the private network 190, such as a second entity different from the entity, one or more customers of the organization, public or government entities, and/or vendors of the organization, rather than being owned and/or operated by the organization itself or an employee or affiliate of the organization), and the public network 195 may include one or more networks (e.g., the internet) that connect the remote user computing device 170 and the remote user computing device 175 to the private network 190 and/or one or more computing devices connected thereto (e.g., the potential counterfeit check evaluation computing platform 110, the check receiving and processing computing device 120, the local user computing device 150, the local user computing device 155).

Figure 8:
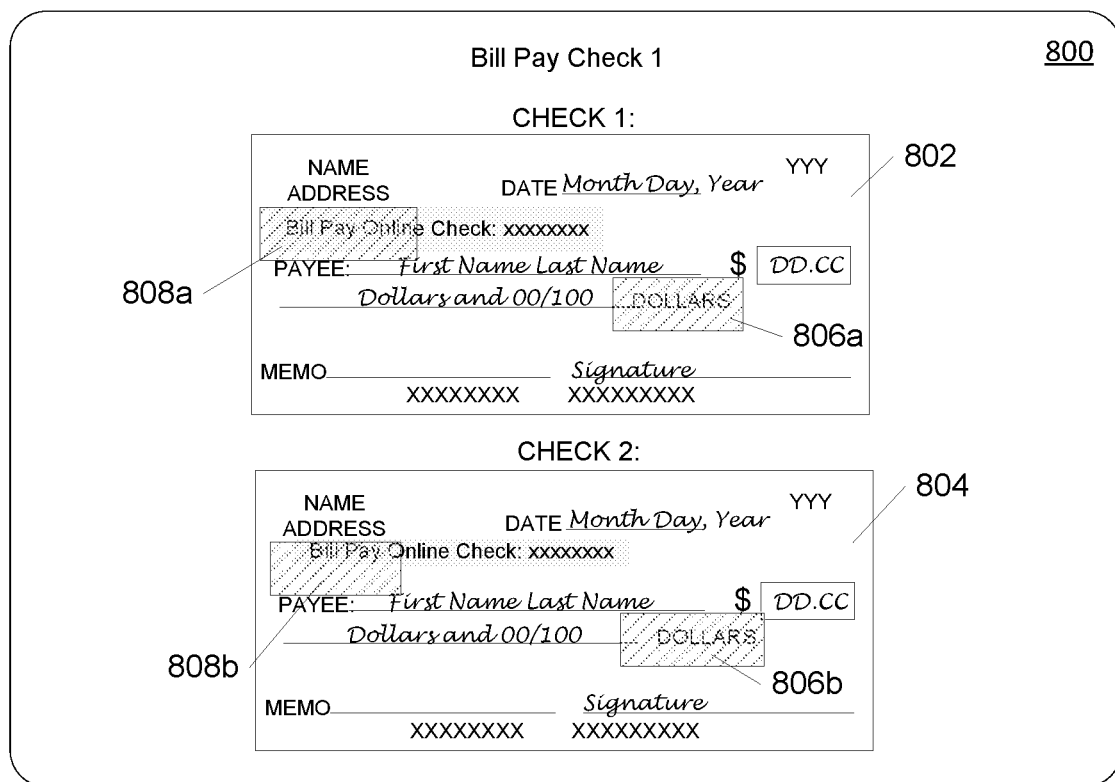
FIG. 8 illustrates an example of a user interface in accordance with one or more aspects described herein.

In some cases, the computing environment 100 may include one or more of a bill pay computing systems 180, a claims computing system 182, and a returns computing system 184. The bill pay computing system 180 may include one or more computing devices, servers, or the like, configured to interface with one or more user devices via the public network 195 and/or the private network 190. The bill pay computing system 180 may allow a user to automate bill payment functionalities by allowing a financial institution associated with the user account to generate and send a physical bill to a third party. In some cases, the user may coordinate with a particular creditor to automate bill payments on a recurring basis. In some cases, a user may manually request a check to be sent to a third party on a case-by-case basis. The bill pay computing system 180 may process user requests upon a triggering condition, such as a recurring payment day or a user request. Based on a triggering condition, the bill pay computing system 180 may print a check on a blank bill play check and include user identifying information (e.g., a name, an account number, a routing number, a payee name, a payee address, a numerical amount, a textual representation of the numerical amount, a bill pay system signature, and the like). In some cases, one or more of a location, shape, or other characteristic of the user identifying information may be used as at least a portion of the bill pay identifier. In some cases, at least a portion of a unique bill pay identifier may be printed on the check. In some cases, a bill pay identifier may be a pre-existing feature of the bill pay check, such as a watermark, hologram, bar code, or other such security feature. In an illustrative example, as shown in FIG. 8, a bill pay identifier may be printed at a particular location of a check and include at least a portion of a standard feature, such as ink color, a field color, textual information (e.g., "Online Check No.:"), and the like. In some cases, each bill pay check may include a unique feature, such as a check number, that may also be associated with the bill pay identifier.

Referring to FIG. 1B, the potential counterfeit check evaluation computing platform 110 may include one or more processors 111, a memory 112, and a communication interface 113. A data bus may interconnect the processor(s) 111, the memory 112, and the communication interface 113. The communication interface 113 may be a network interface configured to support communication between the potential counterfeit check evaluation computing platform 110 and one or more networks (e.g., the private network 190, the public network 195, or the like). The memory 112 may include one or more program modules having instructions that when executed by the processor(s) 111 cause the potential counterfeit check evaluation computing platform 110 to perform one or more functions described herein and/or one or more databases that may store and/or otherwise maintain information which may be used by such program modules, databases, and/or the processor(s) 111. In some instances, the one or more program modules and/or databases may be stored by and/or maintained in different memory units of the potential counterfeit check evaluation computing platform 110 and/or by different computing devices that may form and/or otherwise make up the potential counterfeit check evaluation computing platform 110.

For example, the memory 112 may have, store, and/or include a check processing module 112a. The check processing module 112a may store instructions and/or data that may cause or enable the potential counterfeit check evaluation computing platform 110 to receive one or more checks, check data, check image data, check validity scores, and the like, for further evaluation. In some examples, the check processing module 112a may extract or parse data associated with the received data to identify a user or user profile or account associated with the payer of the check being evaluated, retrieve a user profile from a user profile database 112f, retrieve a bill pay profile from a bill pay profile database 112g, and the like.

The potential counterfeit check evaluation computing platform 110 may further have, store and/or include a match detection and evaluation module 112b. The match detection and evaluation module 112b may store instructions and/or data that may cause or enable the potential counterfeit check evaluation computing platform 110 to process received check data, images, and the like, compare the received checks, check images, check data and the like to a plurality of checks in a user profile, and identify regions, fields, or other check elements that match or do not match. For instance, as discussed above, the match detection and evaluation module 112b may evaluate a location (e.g., based on one or more pixel locations) of static and/or dynamic elements of a check or other instrument being evaluated with corresponding locations on one or more checks in the user profile. Based on this evaluation, the match detection and evaluation module 112b may determine whether regions, fields, elements or the like, of the check being evaluated match one or more checks in the user profile. If so, the check is likely not fraudulent or counterfeit. If not, the check is likely fraudulent or counterfeit.

In some examples, matching and/or non-matching regions, fields, elements or the like may be visually displayed to a user. For instance, the match detection and evaluation module 112b may identify matching and/or non-matching regions on the check being evaluated and one or more checks in a user profile and may highlight or otherwise flag those regions, fields, elements, or the like. The user interface generation module 112e may include instructions and/or data that may cause or enable the potential counterfeit check evaluation computing platform 110 to generate a user interface displaying the check being evaluated and the one or more matching or non-matching checks simultaneously. The user interface may include images of the check being evaluated and the matching/non-matching checks, as well as highlighting or other enhancements on or near the regions, elements, fields, or the like, that are matching or non-matching. In some examples, the user interface may further include options for additional processing. For instance, if the check being evaluated matches the checks on the user profile, the user interface may include a selectable option to add the check being evaluated (or image thereof) to the user profile. Various other recommendations and/or options may be provided via the user interface without departing from the invention.

The potential counterfeit check evaluation computing platform 110 may further have, store and/or include a machine learning engine 112c and one or more machine learning datasets 112d. The machine learning engine 112c and the machine learning datasets 112d may store instructions and/or data that may cause or enable the potential counterfeit check evaluation computing platform 110 to evaluate received checks as compared to checks stored within a user profile to determine a likelihood that the check being evaluated is fraudulent. The machine learning datasets 112d may be generated based on analyzed data (e.g., data from previously received data, previously analyzed checks, and the like), raw data, and/or received from one or more outside sources.

The machine learning engine 112c may receive check images and/or data and, using one or more machine learning algorithms, may generate the one or more machine learning datasets 112d. Various machine learning algorithms may be used without departing from the scope of this disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate the one or more machine learning datasets 112d.

In some examples, the machine learning datasets 112d may include machine learning data linking one or more user check element characteristics to previously identified fraudulent or counterfeit checks. The machine learning datasets 112d may be updated and/or validated based on subsequent data received, for example, after a check has been evaluated, identified as fraudulent, added to a user profile, or the like.

In some examples, the machine learning datasets 112d may be used by, for example, match detection and evaluation module 112b to evaluate checks to determine whether a match exists, regions, fields or elements that match, or the like.

The potential counterfeit check evaluation computing platform 110 may further have, store and/or include a user profile database 112f. The user profile database 112f may store user profiles and associated information, such as name of a user, account information, contact information, or the like. In some examples, the user profiles may store one or more checks or check images associated with the user or user account that are identified as not fraudulent for later comparison to checks being evaluated for authenticity. The checks or check images may correspond to a plurality of previously processed checks or other instruments that, in at least some examples, were determined to be valid.

The potential counterfeit check evaluation computing platform 110 may further have, store and/or include a bill pay profile database 112g. The bill pay profile database 112g may be separate from the user profile database 112f or may be associated with at least a portion of the user profile database 112f In some cases, the bill pay profile database 112g may store bill pay profiles and associated information, such as name of a check manufacturer, characteristic features of a bill pay check (e.g., physical dimensions of a bill pay check, and the like), location, size and shape information associated with pre-printed designs, location, size and shape information associated with security features, location of printed information associated with a user such as user name, account information, contact information, font information, or the like. In some examples, the bill pay profiles may store one or more checks or check images associated with the bill pay system, check manufacturers, or manufacturing runs, that are identified as not fraudulent for later comparison to checks being evaluated for authenticity. The checks or check images may correspond to a plurality of previously processed checks or other instruments that, in at least some examples, were determined to be valid.

Figure 2A:
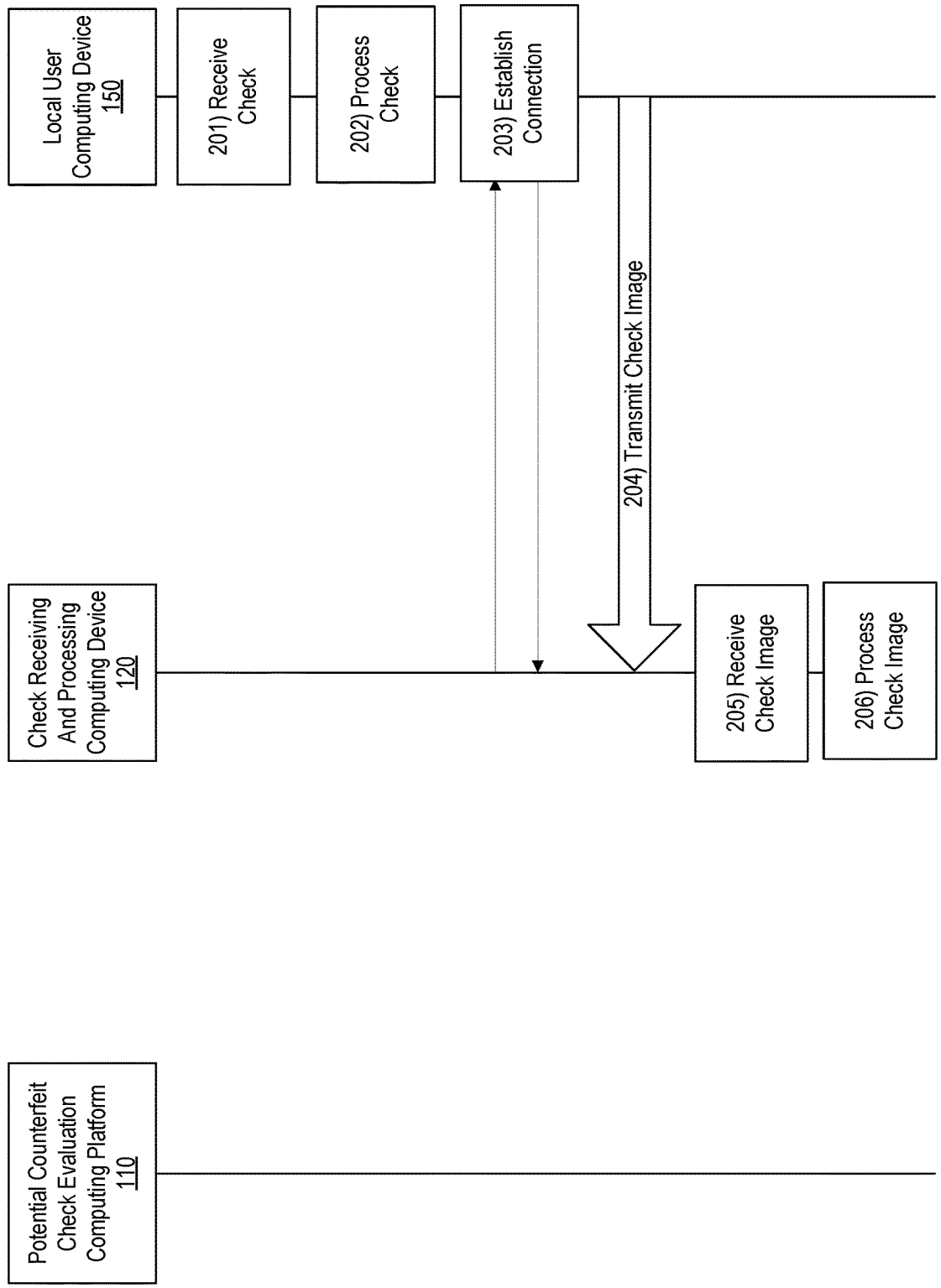
FIGS. 2A-2C depict an illustrative event sequence for implementing item validation and image evaluation functions in accordance with one or more aspects described herein.
Figure 2B:
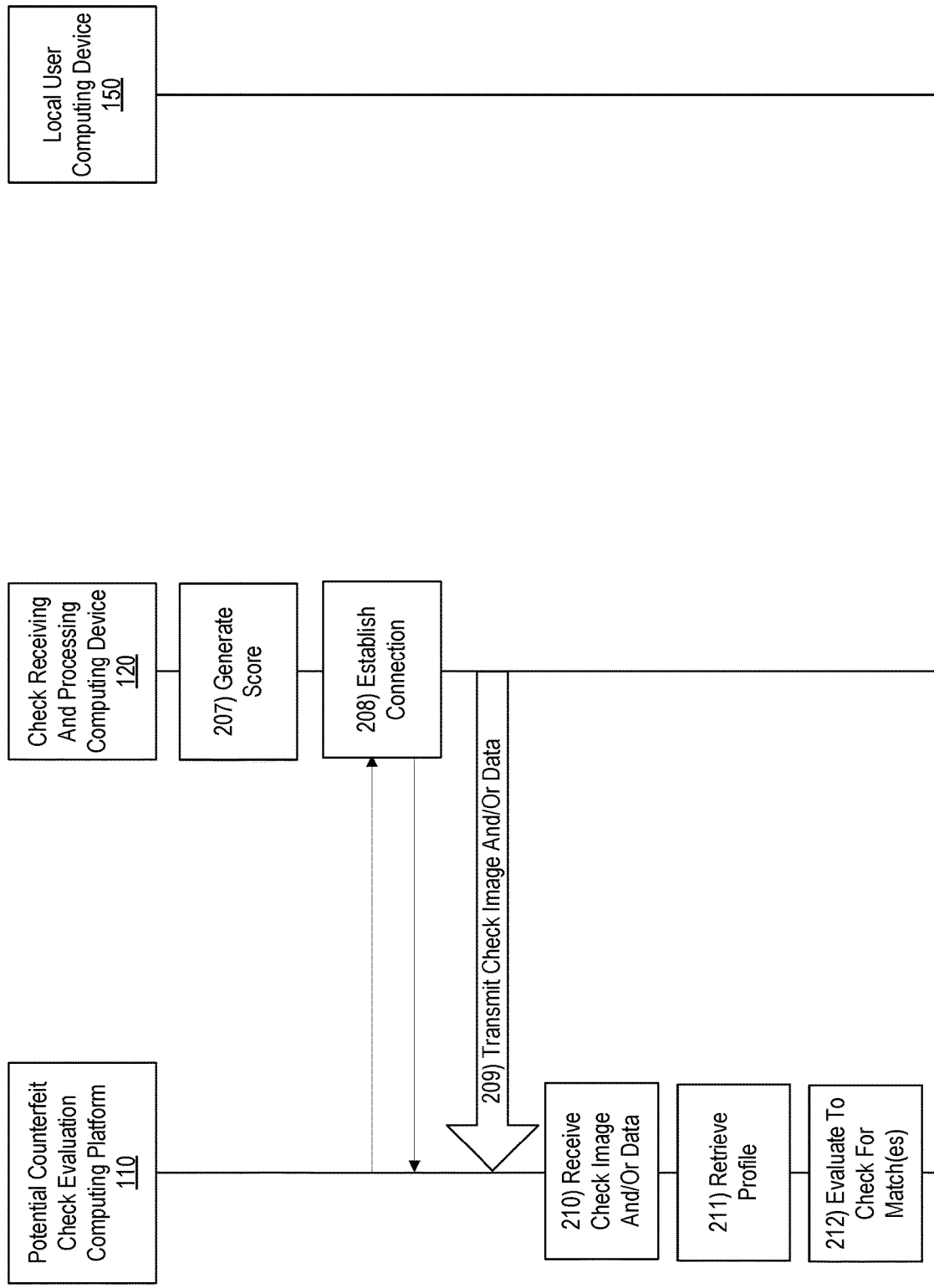
Figure 2C:
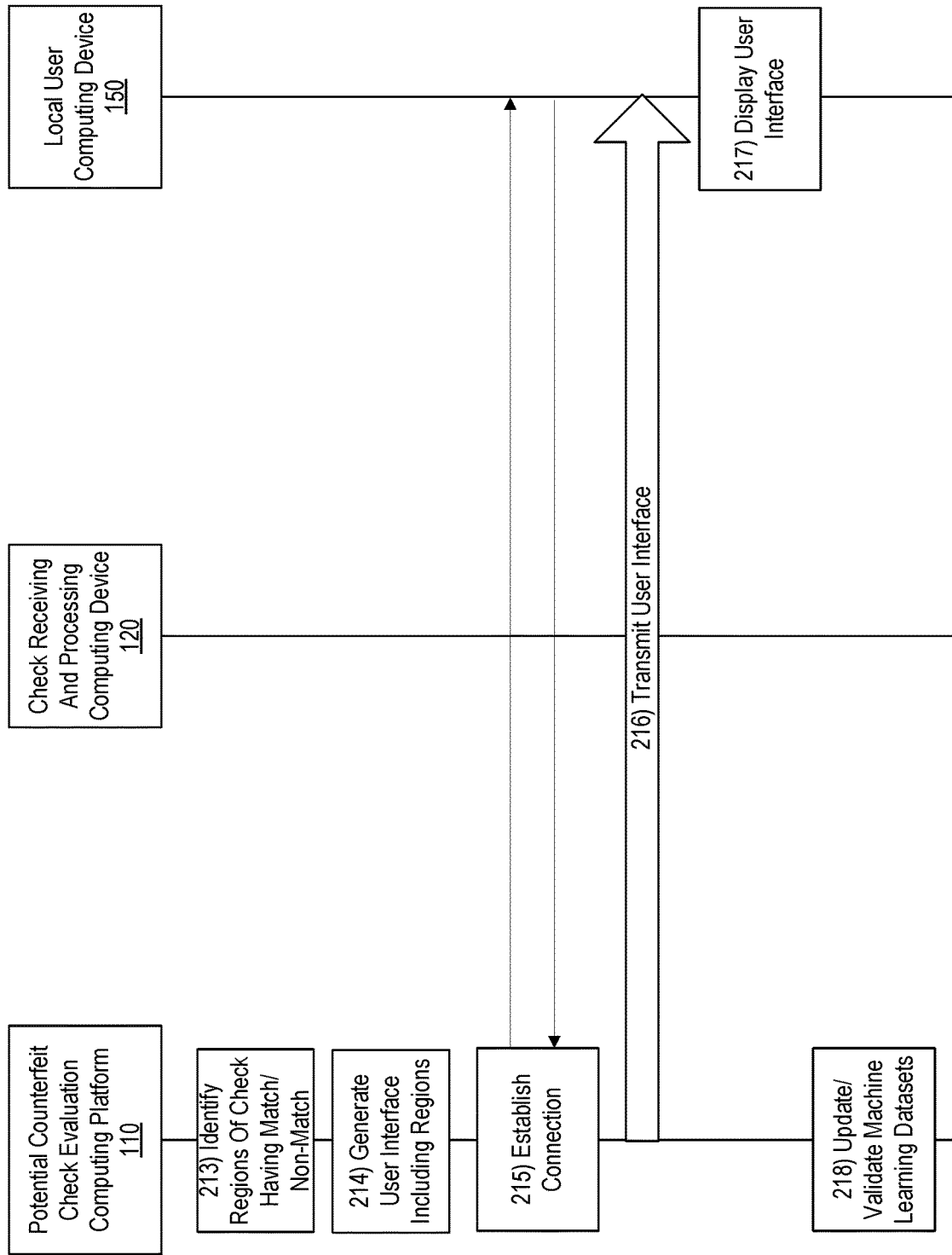

FIGS. 2A-2C depict an illustrative event sequence for implementing and using item validation and image evaluation functions in accordance with one or more aspects described herein. The events shown in the illustrative event sequence are merely one example sequence and additional events may be added, or events may be omitted, without departing from the use or functionality contained in this disclosure.

Referring to FIG. 2A, at step 201, a check may be received by a device. For instance, a check or other instrument may be received by the local user computing device 150. As discussed herein, the local user computing device 150 may include an ATM or other self-service kiosk, a banking associate computing device, or the like. Although the event sequence shown and described includes receiving a check by a local user computing device 150, in some examples, the check may be received by a remote user computing device 170 (e.g., via mobile or online banking applications) without departing from the scope or functionality contained in this disclosure.

At step 202, preliminary processing of the check may be performed. For instance, if the check may be converted to a digital image. Additionally or alternatively, the check image may be stored by the local user computing device 150, transmitted to another device for storage or the like.

At step 203, a connection may be established between the local user computing device 150 and the check receiving and processing computing device 120. For instance, a first wireless connection may be established between the local user computing device 150 and the check receiving and processing computing device 120. Upon establishing the first wireless connection, a communication session may be initiated between the check receiving and processing computing device 120 and the local user computing device 150.

At step 204, the check or check image may be transmitted from the local user computing device 150 to the check receiving and processing computing device 120. For instance, the check image may be transmitted during the communication session initiated upon establishing the first wireless connection.

At step 205, the check image may be received by the check receiving and processing computing device 120. At step 206, the check image may be processed. For instance, the check image may be evaluated to determine a likelihood that the check is counterfeit or fraudulent. As discussed herein, in some examples, the check image being evaluated may be compared to check images stored in a user profile associated with the payer of the check being evaluated. For instance, a user profile including a plurality of checks written by a user may be generated and stored. Those checks may then be compared to checks being evaluated to determine whether elements of the check being evaluated match elements of one or more checks in the user profile.

With reference to FIG. 2B, at step 207, a validity score may be generated by the potential counterfeit check evaluation computing platform 110. For instance, a validity score indicating a likelihood of validity of the check based on the matching evaluation process may be generated.

At step 208, a connection may be established between the check receiving and processing computing device 120 and the potential counterfeit check evaluation computing platform 110. For instance, a second wireless connection may be established between the check receiving and processing computing device 120 and the potential counterfeit check evaluation computing platform 110. Upon establishing the second wireless connection, a communication session may be initiated between the check receiving and processing computing device 120 and the potential counterfeit check evaluation computing platform 110.

At step 209, the check image and/or associated data (e.g., validity score) may be transmitted from the check receiving and processing computing device 120 to the potential counterfeit check evaluation computing platform 110. For instance, the check image and/or associated data may be transmitted during the communication session initiated upon establishing the second wireless connection.

At step 210, the check image and/or data may be received by the potential counterfeit check evaluation computing platform 110. At step 211, a user profile associated with a payer of the check being evaluated and/or a bill pay profile associated with a bill pay computing system may be received. For instance, data may be extracted from the check image or associated data to identify a user, a bill pay system, an account, and the like, associated with the check. Based on this extracted information, the potential counterfeit check evaluating computing platform 110 may retrieve, e.g., from one or more databases, a user profile and/or a bill pay profile associated with the user and associated check images, data and the like.

At step 212, the check image may be further evaluated (e.g., by a second system different from a system of the check receiving and processing computing device and subsequent to evaluation by the check receiving and processing computing device 120). For instance, the check image may be further compared to check images in the retrieved user profile and/or a bill pay profile to evaluate one or more regions, fields, elements, or the like, of the check to determine whether one or more matches exist.

With reference to FIG. 2C, at step 213, matching and/or non-matching regions, fields, elements, and the like, of the check or check image being evaluated and one or more checks or check images from the user profile may be identified. At step 214, a user interface screen for display via a display device of a user interface may be generated. In some examples, the user interface screen may include images of the check being evaluated and one or more checks from the user profile having one or more regions, fields, elements, or the like that match or do not match corresponding regions, fields, elements, or the like, of the check being evaluated. Further, the user interface screen may include highlighting of the matching or non-matching aspects or other enhancements identifying matching or non-matching regions, fields, elements, and the like.

Additionally or alternatively, the user interface screen may include one or more recommendations or selectable options. For instance, if at least a threshold number of regions, fields, elements, or the like match, the generated user interface may include an option to add the check being evaluated to the user profile. In some examples, the threshold may be retrieved from a database. In some examples, the threshold may include all regions, fields, elements, or the like, matching. In some arrangements, if a validity score is above a pre-determined threshold, the user interface screen may be generated to include an option to add the check image being evaluated to the user profile. Various other recommendations, selectable options, and the like, may be included in one or more user interface screens without departing from the invention.

At step 215, a connection may be established between the potential counterfeit check evaluation computing platform 110 and the local user computing device 150. For instance, a third wireless connection may be established between the potential counterfeit check evaluation computing platform 110 and the local user computing device 150. Upon establishing the third wireless connection, a communication session may be initiated between the local user computing device 150 and the potential counterfeit check evaluation computing platform 110.

At step 216, the generated user interface screen may be transmitted to the local user computing device 150. For instance, the generated user interface screen may be transmitted to the local user interface 150 during the communication session initiated upon establishing the third wireless connection.

At step 217, the generated user interface screen may be received by the local user computing device 150 and caused to be displayed on a display of the local user computing device.

At step 218, one or more machine learning datasets may be updated based on the check image evaluation, generated user interface screen, and the like. For instance, aspects related to number of matches, fields, regions or elements that match or do not match, validity score, and the like, determined or used in evaluating the check image may be used to update or validate one or more machine learning datasets.

Figure 3:
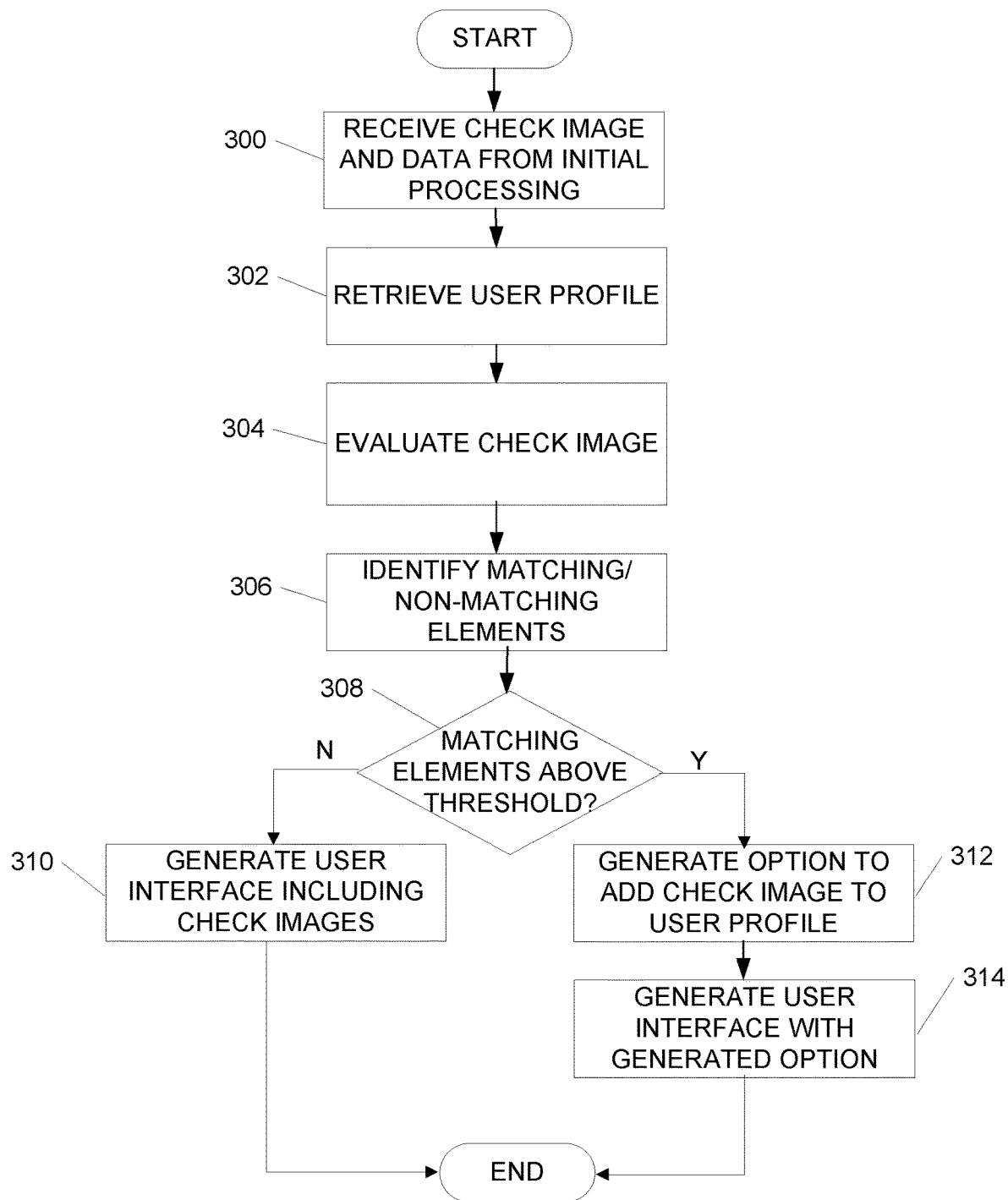
FIG. 3 depicts an illustrative method for implementing and using a system to perform item validation and image evaluation functions, according to one or more aspects described herein.
Figure 5:
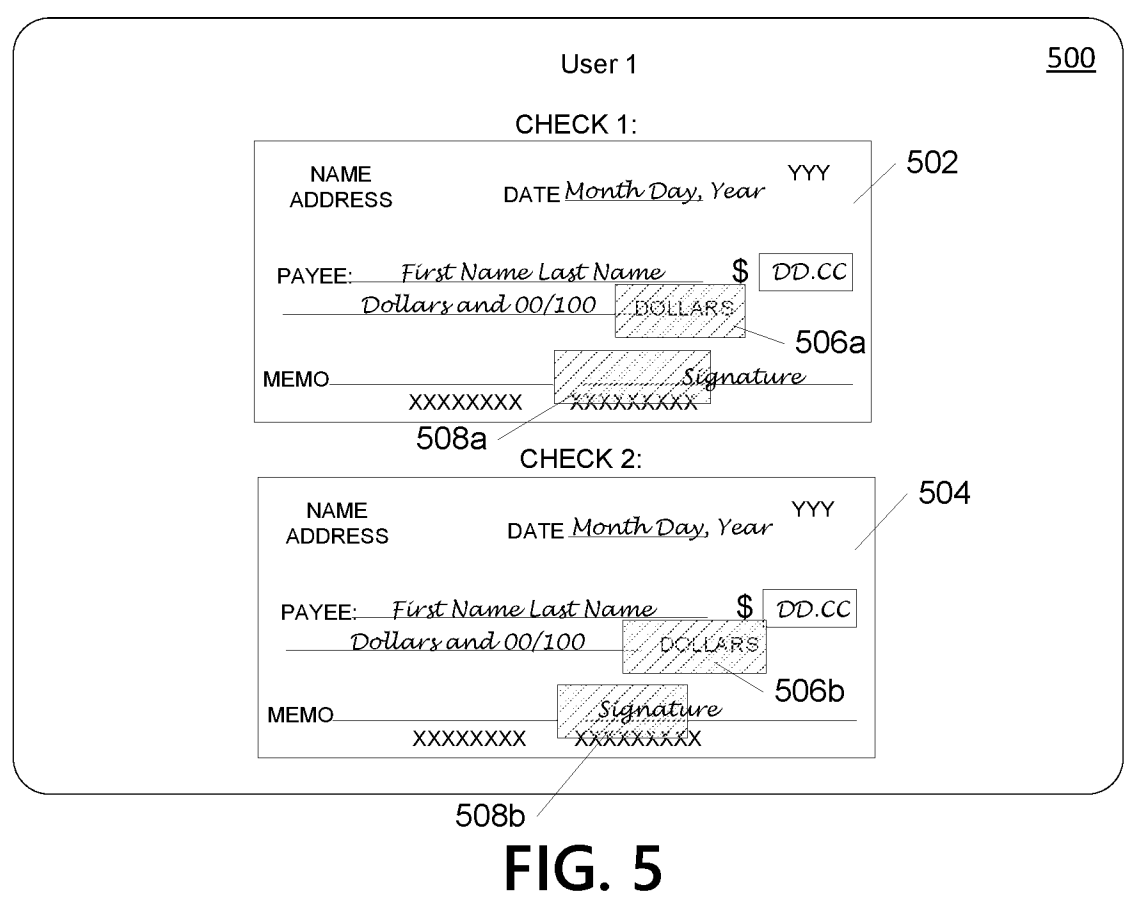

FIG. 3 is a flow chart illustrating one example method of providing item validation and image evaluation functions according to one or more aspects described herein. The processes illustrated in FIG. 5 are merely some example processes and functions. The steps shown may be performed in a different order, more steps may be added, or one or more steps may be omitted without departing from the invention.

At step 300, a check image and associated data may be received from a system, such as the check receiving and processing computing device 120. In some examples, the check may have been previously processed by the check receiving and processing computing device and a validity score may be determined indicating a likelihood that the check or check image is valid or fraudulent.

At step 302, a user profile may be retrieved. For instance, based on the received check image and associated data, a user profile may be retrieved from a database. In some examples, the user profile and/or bill pay profile may include a plurality of previously processed check images associated with the user (e.g., drawn on an account of the user) and/or a bill pay computing system that have been deemed valid and/or not fraudulent or counterfeit.

At step 304, the received check image may be evaluated. For instance, the check image being evaluated may be compared to the check images in the user profile to identify points, regions, fields, elements, or the like, on the check being evaluated that match or do not match corresponding points, regions, fields, elements or the like on the check images from the user profile. In some examples, machine learning may be used to perform some or all of this evaluation.

At step 306, matching and/or non-matching elements of the check being evaluated and one or more checks from the user profile may be identified.

At step 308, a determination may be made as to whether there is a sufficient number of matches. For instance, a determination may be made as to whether a number of matches is above a predetermined threshold. If not, a user interface screen may be generated included the check images in step 310.

If the number of matches is above the threshold in step 308, an option to add the check image of the check image being evaluated to the user profile may be generated in step 312. In step 314, a user interface may be generated including the check images and the option to add the check image to the user profile. The user interface may be transmitted to one or more user devices and displayed on the devices.

Figure 4:
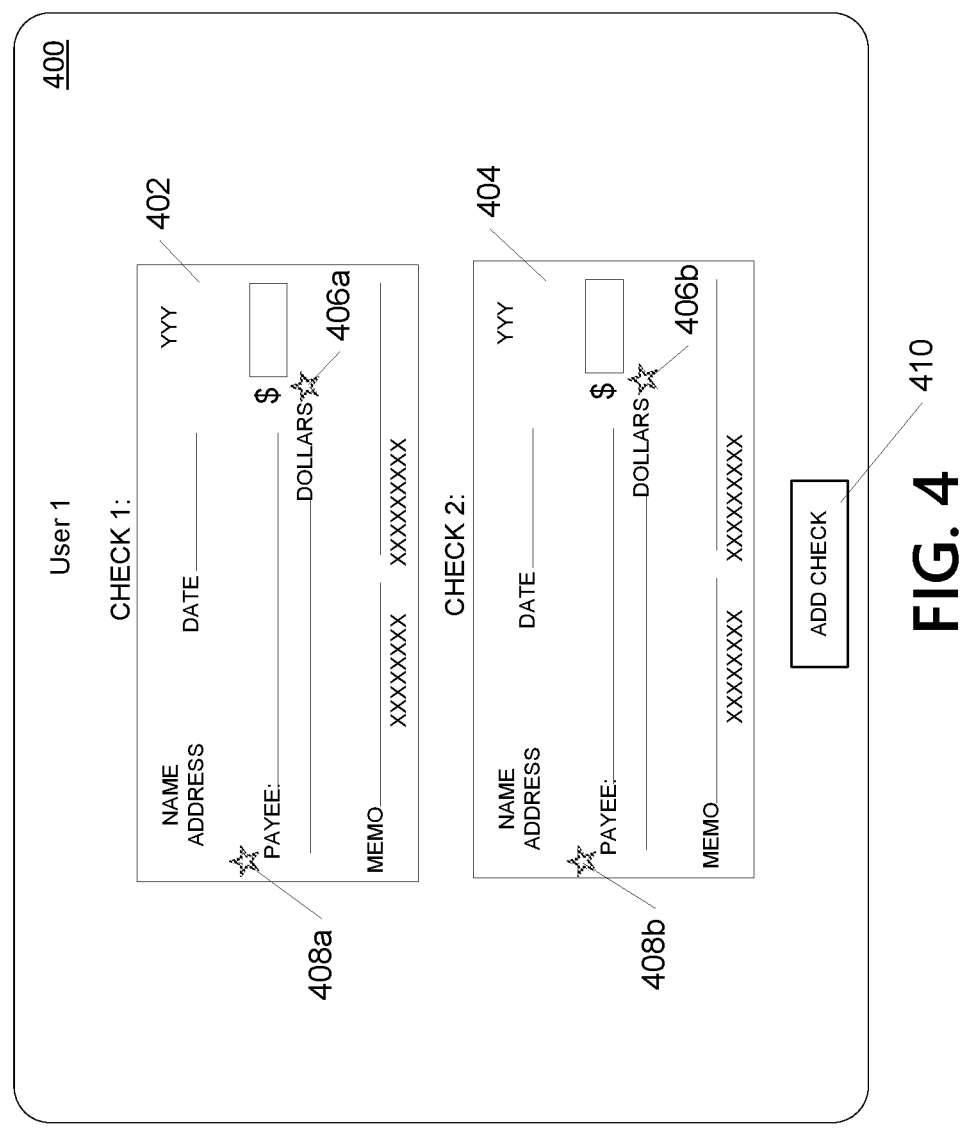

FIG. 4 illustrates one example user interface that may be generated based on the item validation and image evaluation functions described herein. The interface screen 400 may include an image of a check 402 being evaluated and one or more images of checks 404 from a user profile associated with user 1. The user interface screen includes enhancements 406a, 406b, 408a, 408b indicating matching elements of the two checks. For instance, as shown in FIG. 4, a star is positioned adjacent to matching elements such as the position of the word "dollars" relative to the line, the position of the word "payee" relative to the payee line. Accordingly, the user interface screen is generated to include an enhancement to indicate matches. For example, the enhancement 406a corresponds to the enhancement 406b adjacent one set of matching elements, while the enhancement 408a corresponds to the enhancement 408b adjacent another set of matching elements. More or fewer matching elements may be identified without departing from the invention.

The user interface 400 may include a selectable option 410 to add the check being evaluated (e.g., "check 1" to the user profile. Selection of this option may prompt display of one or more additional user interfaces.

FIG. 5 illustrates another example of an illustrative user interface screen that may be generated based on the item validation and image evaluation functions described herein. The user interface screen 500 may include an image of a check 502 being evaluated and one or more images of checks 504 from a user profile associated with user 1. The user interface screen 500 may include enhancements 506a, 506b, 508a, 508b (e.g., highlighting) indicating non-matching elements of the two checks. For instance, as shown in FIG. 5, the word "dollars" and corresponding line are highlighted in each check to indicate that the two checks do not match (e.g., the enhancement 506a illustrates the word "dollars" positioned closer to the line than by the enhancement 506b). In another example, because the signature of check 2 begins closer to the start of the signature line than the signature in check 1, the corresponding regions on each check are highlighted in the enhancements 508a, 508b, to indicate that the elements do not match. More or fewer non-matching elements may be identified without departing from the invention.

In some examples, the enhancements (e.g., highlighting, embellishments, icons, or the like) used to identify matching elements may be the same or substantially similar to enhancements used to identify non-matching elements. In other examples, enhancements used to identify matching elements may be different from enhancements used to identify non-matching elements.

As discussed herein, aspects described are directed to systems, devices and arrangements for evaluating the validity of an item, such as a check or other instrument, and identifying aspects of the check or other instrument that formed the basis for the determination of validity. Arrangements discussed herein allow for evaluation of checks or other instruments that have been previously evaluated in order to verify the output of the evaluation, understand the basis for the output, and the like. This data may then be used to further update, validate, and/or refine not only the systems and arrangements described herein but also systems and arrangements performing an initial evaluation of a check or other instrument.

The above-described examples and arrangements are merely some example arrangements in which the systems described herein may be used. Various other arrangements employing aspects described herein may be used without departing from the invention.

Figure 6:
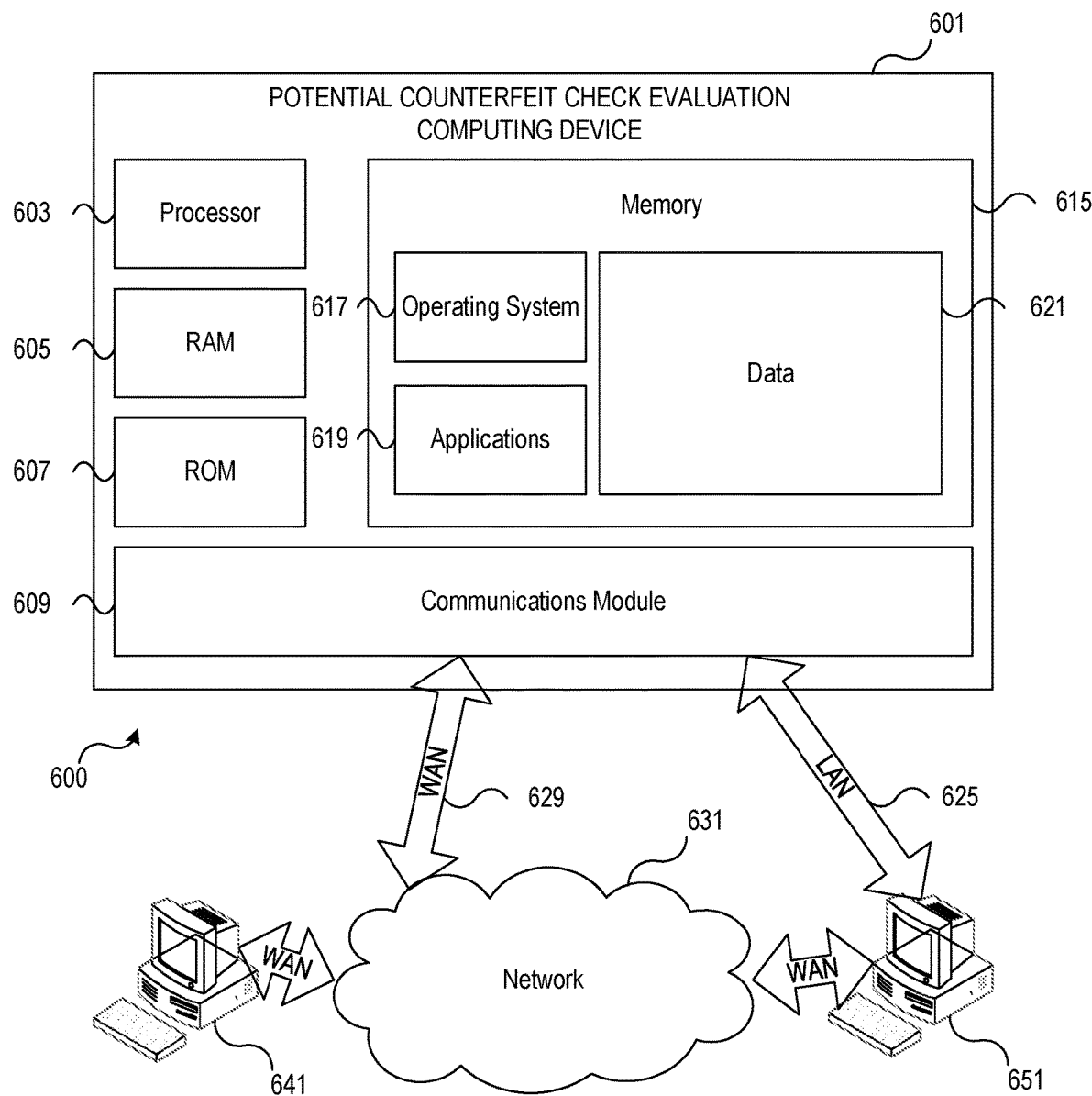
FIG. 6 illustrates an example of an illustrative operating environment in which various aspects of the disclosure may be implemented in accordance with one or more aspects described herein.

FIG. 6 depicts an illustrative operating environment 600 in which various aspects of the present disclosure may be implemented in accordance with one or more example embodiments. Referring to FIG. 6, the computing system environment 600 may be used according to one or more illustrative embodiments. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in illustrative computing system environment 600.

The computing system environment 600 may include the potential counterfeit check evaluation computing device 601 having a processor 603 for controlling overall operation of the potential counterfeit check evaluation computing device 601 and its associated components, including a Random Access Memory (RAM) 605, a Read-Only Memory (ROM) 607, a communications module 609, and a memory 615. The potential counterfeit check evaluation computing device 601 may include a variety of computer readable media. This computer readable media may be any available media that may be accessed by the potential counterfeit check evaluation computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the potential counterfeit check evaluation computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on the potential counterfeit check evaluation computing device 601. Such a processor may execute computer-executable instructions stored on a computer-readable medium.

Software may be stored within the memory 615 and/or storage to provide instructions to the processor 603 for enabling the potential counterfeit check evaluation computing device 601 to perform various functions as discussed herein. For example, the memory 615 may store software used by the potential counterfeit check evaluation computing device 601, such as an operating system 617, one or more application programs 619, and at least one associated database 621. In addition, some or all of the computer executable instructions for the potential counterfeit check evaluation computing device 601 may be embodied in hardware or firmware. Although not shown, the RAM 605 may include one or more applications representing the application data stored in the RAM 605 while the potential counterfeit check evaluation computing device 601 is on and corresponding software applications (e.g., software tasks) are running on the potential counterfeit check evaluation computing device 601.

The communications module 609 may include a microphone, keypad, touch screen, and/or stylus through which a user of the potential counterfeit check evaluation computing device 601 may provide input, and may also include one or more of a speaker for providing audio output and a video display device for providing textual, audiovisual and/or graphical output. The computing system environment 600 may also include one or more optical scanners (not shown).

The potential counterfeit check evaluation computing device 601 may operate in a networked environment supporting connections to one or more remote computing devices, such as the computing devices 641 and 651. The computing devices 641 and 651 may be personal computing devices or servers that include any or all of the elements described above relative to the potential counterfeit check evaluation computing device 601.

The network connections depicted in FIG. 6 may include a Local Area Network (LAN) 625 and/or a Wide Area Network (WAN) 629, as well as other networks. When used in a LAN networking environment, the potential counterfeit check evaluation computing device 601 may be connected to the LAN 625 through a network interface or adapter in the communications module 609. When used in a WAN networking environment, the potential counterfeit check evaluation computing device 601 may include a modem in the communications module 609 or other means for establishing communications over the WAN 629, such as via a network 631 (e.g., public network, private network, Internet, intranet, and the like). The network connections shown are illustrative and other means of establishing a communications link between the computing devices may be used. Various protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
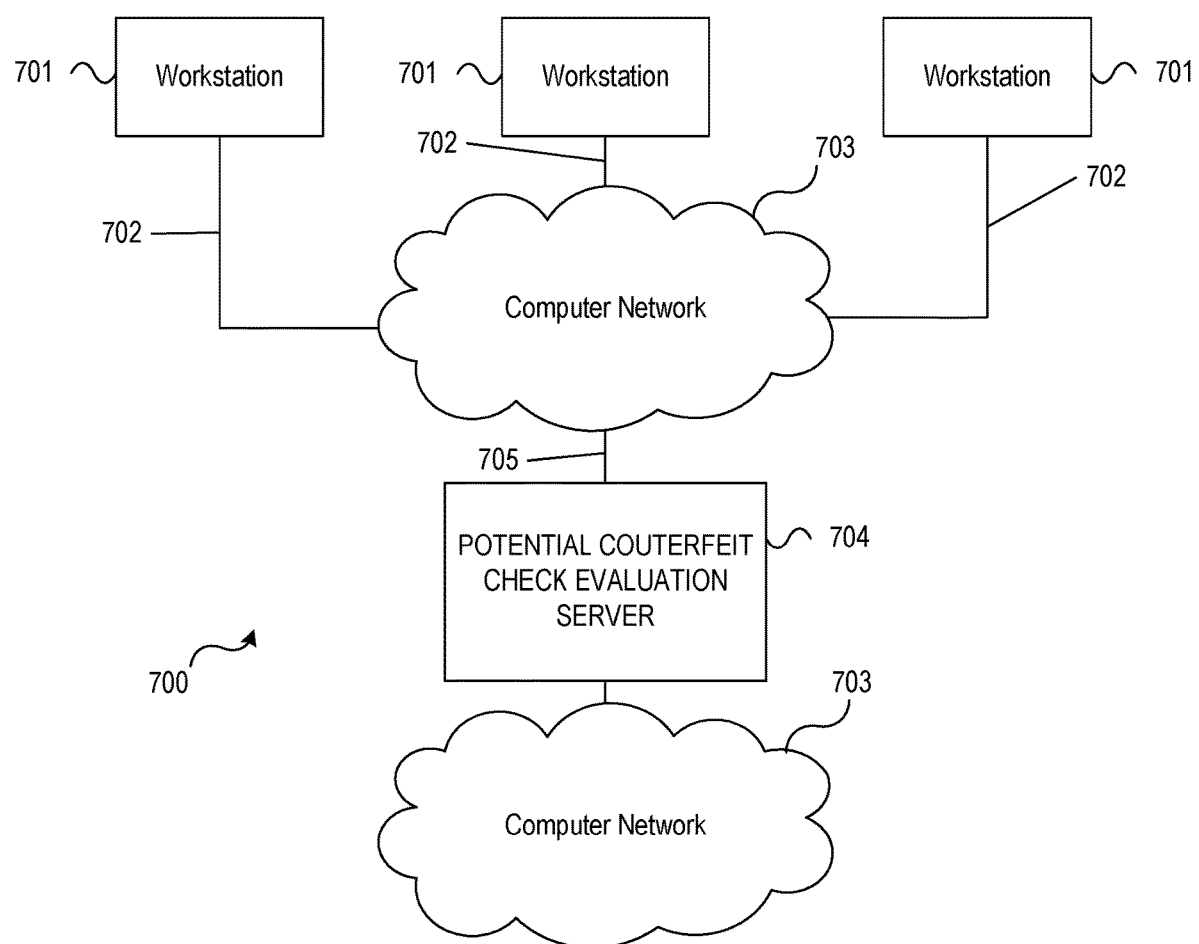
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, an illustrative system 700 may be used for implementing example embodiments according to the present disclosure. As illustrated, the system 700 may include one or more workstation computers 701. The workstation 701 may be, for example, a desktop computer, a smartphone, a wireless device, a tablet computer, a laptop computer, and the like, configured to perform various processes described herein. The workstations 701 may be local or remote, and may be connected by one of the communications links 702 to the computer network 703 that is linked via communications a link 705 to the potential counterfeit check evaluation server 704. In the system 700, the potential counterfeit check evaluation server 704 may be a server, processor, computer, or data processing device, or combination of the same, configured to perform the functions and/or processes described herein. The server 704 may be used to receive check images and associated data and/or validation scores, retrieve user profile, evaluate the check image compared to the user profile, identify matching or non-matching elements, generate user interfaces, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and potential counterfeit check evaluation server 704, such as network links, dial-up links, wireless links, hard-wired links, as well as network types developed in the future, and the like.

FIG. 8 illustrates an example of a user interface in accordance with one or more aspects described herein. The user interface screen 800 may include an image of a check 802 being evaluated and one or more images of checks 804 from a bill pay profile associated with the bill pay computing system 180. The user interface screen 800 may include enhancements 806a, 806b, 808a, 808b (e.g., highlighting) indicating non-matching elements of the two checks. For instance, as shown in FIG. 8, the bill pay identifier (e.g., "Bill Pay Online Check: xxxxxxxx") and corresponding shaded field are highlighted in each check to indicate that the two checks do not match (e.g., the enhancement 808a illustrates the bill pay identifier positioned closer to the address block than by the enhancement 808b). In another example, the word "dollars" and corresponding line are highlighted in each check to indicate that the two checks do not match (e.g., the enhancement 806a illustrates the word "dollars" positioned closer to the line than by the enhancement 806b). More or fewer non-matching elements may be identified without departing from the invention.

In some examples, the enhancements (e.g., highlighting, embellishments, icons, or the like) used to identify matching elements may be the same or substantially similar to enhancements used to identify non-matching elements. In other examples, enhancements used to identify matching elements may be different from enhancements used to identify non-matching elements.

As discussed herein, aspects described are directed to systems, devices and arrangements for evaluating the validity of an item, such as a check or other instrument, and identifying aspects of the check or other instrument that formed the basis for the determination of validity. Arrangements discussed herein allow for evaluation of checks or other instruments that have been previously evaluated in order to verify the output of the evaluation, understand the basis for the output, and the like. This data may then be used to further update, validate, and/or refine not only the systems and arrangements described herein but also systems and arrangements performing an initial evaluation of a check or other instrument.

The above-described examples and arrangements are merely some example arrangements in which the systems described herein may be used. Various other arrangements employing aspects described herein may be used without departing from the invention.

Figure 9:
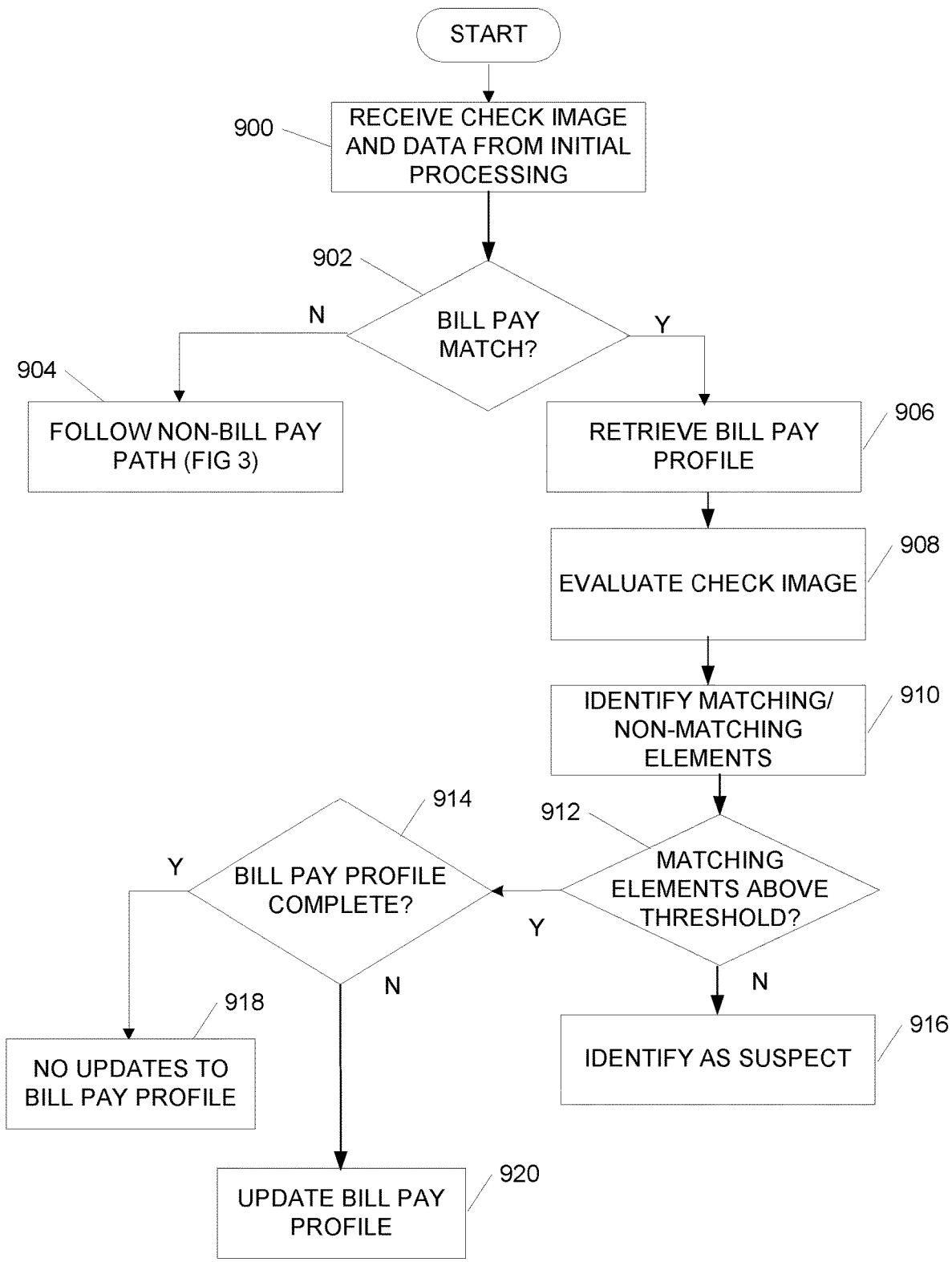
FIG. 9 depicts an illustrative method for implementing and using a system to perform bill pay profile evaluation functions, according to one or more aspects described herein.

FIG. 9 depicts an illustrative method for implementing and using a system to perform bill pay profile evaluation functions, according to one or more aspects described herein. The processes illustrated in FIG. 9 are merely illustrative examples of processes and functions. The steps shown may be performed in a different order, more steps may be added, or one or more steps may be omitted without departing from the scope of the disclosure.

At step 900, a check image and associated data may be received from a system, such as the check receiving and processing computing device 120. In some examples, the check may have been previously processed by the check receiving and processing computing device and a validity score may be determined indicating a likelihood that the check or check image is valid or fraudulent.

At step 902, a bill pay profile may be retrieved from a data store. For instance, based on the received check image and associated data (e.g., a bill pay identifier), a bill pay profile may be retrieved from a database. In some examples, the bill pay profile may include a plurality of previously processed check images associated with the bill pay system 180 that have been deemed valid and/or not fraudulent or counterfeit.

If, at step 902, the check image was found not to be associated with a bill pay profile (e.g., a user check), the processes and/or functions to assess the validity of a user check against a user profile is followed at step 904, such as those described with respect to FIG. 3.

If, at step 902, a bill pay check was identified, such as by matching a predefined bill pay identifier, a bill pay profile may be retrieved from a data store and the received check image may be evaluated at step 908. For instance, a bill pay profile may be retrieved from memory and the check image being evaluated may be compared to the check images in the bill pay profile to identify points, regions, fields, elements, or the like, on the check being evaluated that match or do not match corresponding points, regions, fields, elements or the like on the check images from the user profile. In some examples, machine learning may be used to perform some or all of this evaluation.

At step 910, matching and/or non-matching elements of the check being evaluated and one or more checks from the user profile may be identified.

At step 912, a determination may be made as to whether there is a sufficient number of matches. For instance, a determination may be made as to whether a number of matches is above or below a predetermined threshold. If not, a user interface screen may be generated, or other identifying information may be attached to the check image to mark it as suspect at step 916.

If the number of matches is above the threshold in step 912, a determination may be made whether the bill pay profile can be considered complete (e.g., the profile contains a specified number of check images, such as 10 images) at step 914. If the bill pay profile is complete, the check image will not be added to the bill pay profile at step 918. The check image may, however, be included in a summary report and/or a user interface screen for viewing by a user.

If the bill play profile is not complete, an option to add the check image of the check image being evaluated to the bill pay profile may be generated in step 920. In some cases, the check image may automatically be added to the check profile. In some cases, a user interface may be generated including the check images and the option to add the check image to the bill pay profile. The user interface may be transmitted to one or more user devices and may be displayed on the devices.

Figure 10:
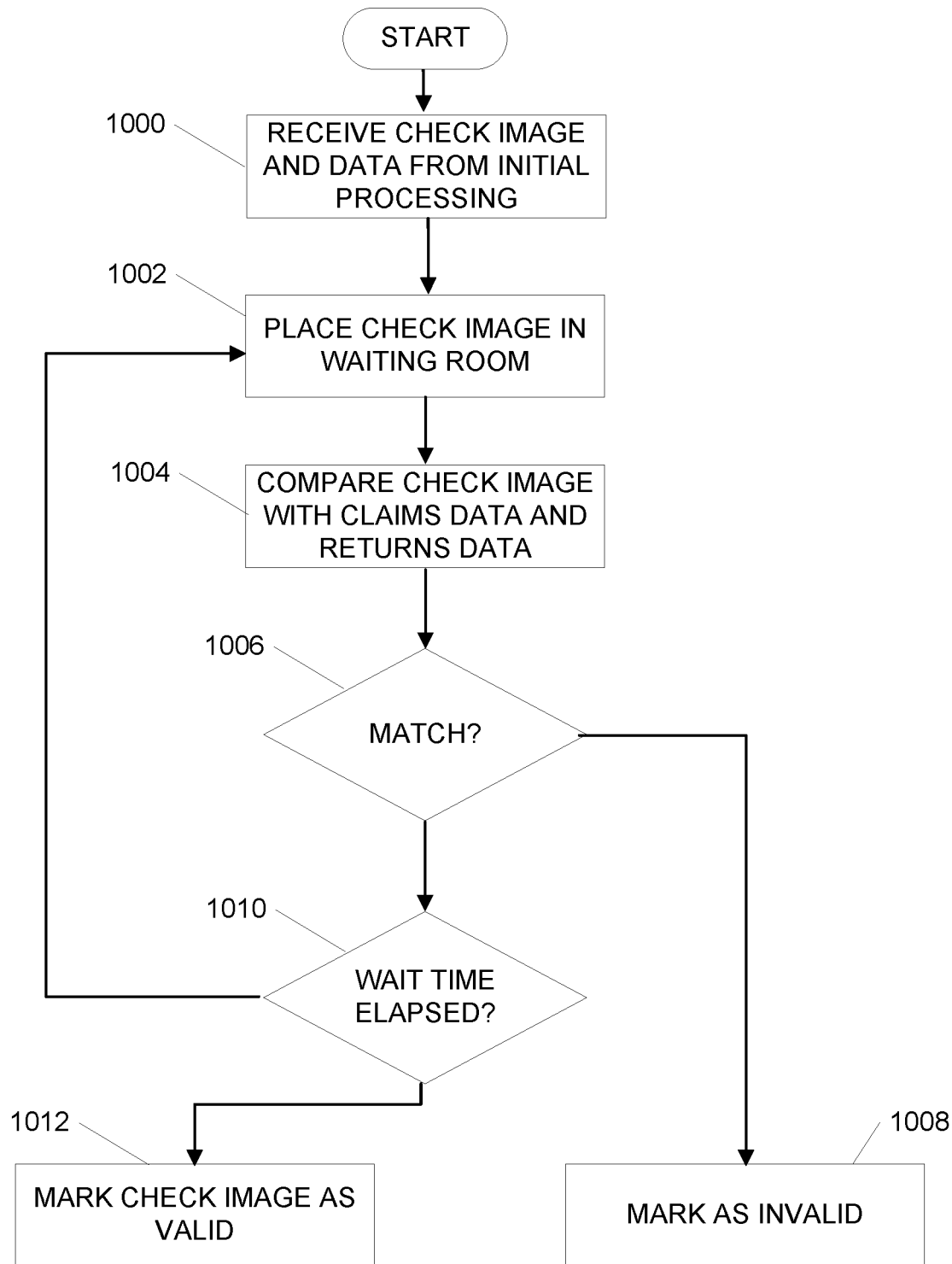
FIG. 10 depicts an illustrative method for implementing and using a system to implement feedback loop functions, according to one or more aspects described herein.

FIG. 10 depicts an illustrative method for implementing and using a system to implement feedback loop functions, according to one or more aspects described herein. The processes illustrated in FIG. 10 are illustrative examples of processes and functions. The steps shown may be performed in a different order, more steps may be added, or one or more steps may be omitted without departing from the scope of the disclosure. In some cases, the illustrative feedback loop process of FIG. 10 may be used to generate fraud scores based on user profiles and/or bill pay profiles created from actual checks being processed. In some cases, a previously unknown or unidentified improper check (e.g., a counterfeit or fraudulent check) may be included in a bill pay profile and/or a user profile if no previous indication exists of that check being fraudulent. If this situation is not corrected by removing these improper checks from the profile(s), later received fraudulent checks may be improperly validated as being authentic by scoring low in the fraud check and may remain undetected.

In some cases, the systems and methods may use information obtained by a claims computing system 182 that receives and/or processes fraud claims entered by users. In some cases, the systems and methods discussed herein may use information obtained by a returns computing system 184 that processes and stores information received from third parties (e.g., financial institutions, and the like) regarding items (e.g., checks or instruments) that were returned as being fraudulent or being suspected of being fraudulent. Periodically, items in the waiting room may be compared the claims information from the claims computing system 182 and/or the returns information retrieved from the returns computing system 184, such as daily, weekly, and the like. If a match was found in any of the claims information or returns information, the matching check or instrument may be removed from the profile or may be prevented from being added to the profile. If, after the waiting period, the check or instrument has not matched to the claims information or returns information, the check or instrument may be processed for inclusion into the profile, such as through the methods of FIG. 3 and/or FIG. 9.

At step 1000, a check image and associated data may be received from a system, such as the check receiving and processing computing device 120. In some examples, the check may have been previously processed by the check receiving and processing computing device and a validity score may be determined indicating a likelihood that the check or check image is valid or fraudulent. The check image may then be placed in a waiting room, at step 1002, for a specified duration of time (e.g., about 10 days, about 20 days, about 30 days, and the like).

At step 1004, the check image in the waiting room may be compared with claims information and/or returns information retrieved from the claims computing system 182 and/or the returns computing system 184. This check may be done on a periodic basis, such as on a daily basis at the end of a business day.

At step 1006, the potential counterfeit check evaluation computing device may determine whether the check matched with a check identified in the returns information and/or the claims information. If so, the check may be marked as being invalid at step 1008. If, at step 1006, no match was found, a determination whether the waiting period has elapsed may be made at step 1010. If not, the claim is returned to the waiting room until the next time to check for matches has arrived. If the wait time has elapsed at 1010, the check image may be marked as potentially being valid and capable of being included in a user profile or a bill pay profile. The check may then be evaluated against an existing user profile or bill pay profile. In some cases, the check may automatically be included in the profile under certain conditions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive an image of a first instrument and associated data from an image processing computing device;
      compare the image to first data retrieved from a first computing system and second data retrieved from a second computing system, wherein the first data and the second data comprises images of invalid instruments;
      after a predetermined time, based on an unmatched condition, extract user data from the received image of the first instrument and associated data;
      retrieve a user profile associated with the user of the first instrument, the user profile including images of a plurality of previously processed instruments;
      compare the received image of the first instrument to the of images of the plurality of previously processed instruments in the user profile;
      identify, based on the comparing, at least one of: an element of the first instrument that matches a corresponding element from at least one instrument of the plurality of previously processed instruments and an element of the first instrument that does not match a corresponding element from at least one instrument of the plurality of previously processed instruments;
      based on an identified element of the first instrument that matches a corresponding element from at least one instrument of the plurality of previously processed instruments;
         generate a first user interface;
         determine whether a number of matches between elements of the first instrument and corresponding elements from at least one instrument of the plurality of previously processed instruments is above a threshold; and
         based on the number of matches being above the threshold, generate a selectable option to add the first instrument to the user profile; and
      based on an identified element of the first instrument that does not match a corresponding element from at least one instrument of the plurality of previously processed instruments, generate a second user interface different from the first user interface.

2. The computing platform of claim 1, wherein the received associated data includes an indication of a validity of the instrument.

3. The computing platform of claim 1, wherein the first computing system comprises a claims processing computing system that processes claims of improper activity reported by users.

4. The computing platform of claim 1, wherein the second computing system comprises a returns computing system processing instruments and instrument information returned from a plurality of third parties.

5. The computing platform of claim 1, wherein the generated first user interface includes the selectable option to add the first instrument to the user profile.

6. The computing platform of claim 1, wherein the received image and associated data is received after the image has been processed by the image processing computing device and after an initial evaluation of validity of the instrument has been determined.

7. The computing platform of claim 1, wherein the first user interface and the second user interface include images of the first instrument and an image of at least one instrument of the plurality of previously processed instruments.

8. The computing platform of claim 1, wherein the first user interface includes enhancements identifying the element of the first instrument that matches the corresponding element from at least one instrument of the plurality of previously processed instruments.

9. A method, comprising:
   at a computing platform comprising at least one processor, memory, and a communication interface:
      receiving, by the at least one processor and via the communication interface, an image of a first instrument and associated data from an image processing computing device;
      extracting, by the at least one processor, user data from the received image of the first instrument and associated data;
      determining, over a specified time period, whether the user data matches first data retrieved from a claims computing system or second data retrieved from a returns computing system;

rejecting, the first instrument if the user data matches information of the first data or the second data;

retrieving, by the at least one processor after the specified time period based on a failure to match user data to the first data or the second data, a user profile associated with a user of the first instrument, the user profile including images of a plurality of previously processed instruments;

comparing, by the at least one processor, the received image of the first instrument to the images of the plurality of previously processed instruments in the user profile;

identifying, by the at least one processor and based on the comparing, at least one of: an element of the first instrument that matches a corresponding element from at least one instrument of the plurality of previously processed instruments and an element of the first instrument that does not match a corresponding element from at least one instrument of the plurality of previously processed instruments;

if an element of the first instrument that matches a corresponding element from at least one instrument of the plurality of previously processed instruments is identified:

generating, by the at least one processor, a first user interface;

determine whether a number of matches between elements of the first instrument and corresponding elements from at least one instrument of the plurality of previously processed instruments is above a threshold; and if the number of matches is above the threshold, generating, by the at least one processor, a selectable option to add the first instrument to the user profile; and if an element of the first instrument that does not match a corresponding element from at least one instrument of the plurality of previously processed instruments is identified, generating, by the at least one processor, a second user interface different from the first user interface.

10. The method of claim 9, wherein the received associated data includes an indication of a validity of the instrument.

11. The method of claim 9, wherein the generated first user interface includes the selectable option to add the first instrument to the user profile.

12. The method of claim 9, wherein the received image and associated data is received after the image has been processed by the image processing computing device and after an initial evaluation of validity of the instrument has been determined.

13. The method of claim 9, wherein the first user interface and the second user interface include images of the first instrument and an image of at least one instrument of the plurality of previously processed instruments.

14. The method of claim 9, wherein the first user interface includes enhancements identifying the element of the first instrument that matches the corresponding element from at least one instrument of the plurality of previously processed instruments.

15. One or more non-transitory computer-readable media storing instructions that, when executed by a computing platform comprising at least one processor, memory, and a communication interface, cause the computing platform to:

receive an image of a first instrument and associated data from an image processing computing device;

compare the image to first data retrieved from a first computing system and second data retrieved from a second computing system, wherein the first data and the second data comprises images of invalid instruments;

after a predetermined time, based on an unmatched condition, extract user data from the received image of the first instrument and associated data;

retrieve a user profile associated with the user of the first instrument, the user profile including images of a plurality of previously processed instruments;

compare the received image of the first instrument to the of images of the plurality of previously processed instruments in the user profile;

identify, based on the comparing, at least one of an element of the first instrument that matches a corresponding element from at least one instrument of the plurality of previously processed instruments and an element of the first instrument that does not match a corresponding element from at least one instrument of the plurality of previously processed instruments;

determine, based on a matched element, whether a number of matches between elements of the first instrument and corresponding elements from at least one instrument of the plurality of previously processed instruments is above a threshold; and when the number of matches is above the threshold, generate a selectable option to add the first instrument to the user profile;

based on an identified element of the first instrument that matches a corresponding element from at least one instrument of the plurality of previously processed instruments, generate a first user interface; and based on an identified element of the first instrument that does not match a corresponding element from at least one instrument of the plurality of previously processed instruments, generate a second user interface different from the first user interface.

16. The one or more non-transitory computer-readable media of claim 15, wherein the received associated data includes an indication of validity of the instrument.

17. The one or more non-transitory computer-readable media of claim 15, wherein the generated first user interface includes the selectable option to add the first instrument to the user profile.

* * * * *

UNITED STATES PATENT AND TRADEMARK OFFICE
CERTIFICATE OF CORRECTION

PATENT NO. : 10,825,279 B2
APPLICATION NO. : 16/211963
DATED : November 3, 2020
INVENTOR(S) : Santhanam et al.

Page 1 of 1

It is certified that error appears in the above-identified patent and that said Letters Patent is hereby corrected as shown below:

In the Claims

Column 21, Line 66:
In Claim 1, delete "the of" and insert --the--

Column 24, Lines 22-23:
In Claim 15, delete "the of" and insert --the--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*